(12) United States Patent
Yun et al.

(10) Patent No.: US 9,081,185 B2
(45) Date of Patent: Jul. 14, 2015

(54) DISPLAY SUBSTRATE AND METHOD OF MANUFACTURING THE SAME

(75) Inventors: Sung-Sik Yun, Suwon-si (KR); Jae-Byung Park, Seoul (KR); Jin-Seob Byun, Seoul (KR); Hyun-Min Cho, Hwaseong-si (KR); Dae-Hyun Kim, Suwon-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 324 days.

(21) Appl. No.: 13/557,606

(22) Filed: Jul. 25, 2012

(65) Prior Publication Data
US 2013/0050794 A1    Feb. 28, 2013

(30) Foreign Application Priority Data
Aug. 22, 2011    (KR) .............................. 2011-0083429

(51) Int. Cl.
*G02B 26/02*    (2006.01)
(52) U.S. Cl.
CPC ...................................... *G02B 26/02* (2013.01)
(58) Field of Classification Search
CPC ............. G02B 26/02; B44C 1/22; B05D 5/06
USPC ........... 359/227, 228, 230, 233, 292; 427/58, 427/123; 216/13
See application file for complete search history.

(56) References Cited

U.S. PATENT DOCUMENTS

| 5,523,616 | A | * | 6/1996 | Den ............................... 257/637 |
| 6,607,992 | B2 | | 8/2003 | Tsujita et al. |
| 2009/0034052 | A1 | * | 2/2009 | Hagood et al. ................ 359/290 |
| 2010/0053727 | A1 | | 3/2010 | Lee et al. |

FOREIGN PATENT DOCUMENTS

| KR | 0950202 | 10/2004 |
| KR | 1020100120419 | 11/2010 |

* cited by examiner

*Primary Examiner* — Euncha Cherry
(74) *Attorney, Agent, or Firm* — F. Chau & Associates, LLC (57) ABSTRACT

The display substrate includes a base substrate, a micro shutter, a first driving electrode, a second driving electrode and a plurality of anchors. The micro shutter is disposed on the base substrate, and includes a plurality of opening parts and a blocking part. The blocking part includes at least two trench structures and the blocking part is disposed between an adjacent pair of the opening parts. The first driving electrode is connected to a first side of the micro shutter. The second driving electrode is connected to a second side of the micro shutter opposite to the first side of the micro shutter. The plurality of anchors fixes the first and second driving electrodes and the micro shutter on the base substrate.

14 Claims, 10 Drawing Sheets

| MULTI-LAYERED STRUCTURE | COMPARATIVE EXAMPLE 1 | EXAMPLE 1 | EXAMPLE 2 |
|---|---|---|---|
| | a-Si 4000Å<br>Al 1400Å<br>SiNx 800Å | a-Si 3000Å<br>Al 1400Å<br>SiO2 850Å<br>Ti 150Å<br>SiNx 800Å | a-Si 3000Å<br>Al 1400Å<br>SiO2 850Å<br>Ti 150Å<br>SiNx 1650Å |

| MULTI-LAYERED STRUCTURE | COMPARATIVE EXAMPLE 2 | EXAMPLE 3 |
|---|---|---|
| | Ti 1500 Å <br> Al 3000 Å <br> Ti 1000 Å <br> SiNx 4000 Å <br> SiNx 800 Å | Ti 1500 Å <br> Al 3000 Å <br> Ti 1000 Å <br> SiNx 1900 Å <br> SiNx 800 Å |

DISPLAY SUBSTRATE AND METHOD OF MANUFACTURING THE SAME

CROSS-REFERENCE TO RELATED APPLICATIONS

This application claims priority under 35 U.S.C. §119 to Korean Patent Application No. 10-2011-0083429, filed on Aug. 22, 2011, the disclosure of which is hereby incorporated by reference herein in its entirety.

BACKGROUND OF THE INVENTION

1. Technical Field

Exemplary embodiments of the present invention relate to a display substrate and to a method of manufacturing the display substrate. More particularly, exemplary embodiments of the present invention relate to a display substrate having a digital micro shutter (DMS) and to a method of manufacturing the display substrate.

2. Description of the Related Art

Generally, a display apparatus displays an image or data inputted by an input device. For example, a cathode ray tube, a liquid crystal display (LCD), a plasma display panel (PDP) and a field emission display have been used for the display apparatus.

Studies on applying a different mode for a display apparatus have been performed. For example, an organic light emitting display (OLED), a possible successor to the LCD and the PDP, is a next generation display apparatus, which has been commercialized. In addition, a display apparatus using a micro electro-mechanical system (MEMS), which has relatively high efficiency for light utilization and relatively fast switching, has been developed.

The display apparatus using the MEMS may include, for example, a first substrate on which a light blocking layer having at least one opening is formed, a digital micro shutter (DMS) having at least one opening, and a second substrate having a circuit which controls opening and closing of the DMS. The DMS moves horizontally by an electrostatic force when an electric signal is applied from the circuit.

For example, when the electric signal is applied to the DMS from the circuit, the DMS moves horizontally by the electrostatic force, so that the opening of the DMS is aligned with the opening of the light blocking layer and thus light passes through the openings. When the electric signal is not applied to the DMS, the DMS moves horizontally by an elastic force, such as, for example, a spring force, so that the opening of the DMS is not aligned with the opening of the light blocking layer and thus the light is blocked.

The DMS includes a metal layer to block the light during the closing of the DMS. If the thickness of the metal layer is increased, the transmitting light may be decreased. The thickness of the metal layer and reflectivity may be significant factors to determine a contrast ratio and a viewing angle in the display apparatus using the MEMS.

In depositing the metal layer on the DMS, the metal layer may be relatively thinly deposited at a side wall and at an edge portion of the DMS. Thus, the light may be leaked out during the closing of the DMS so that the contrast ratio may be decreased.

SUMMARY OF THE INVENTION

Exemplary embodiments of the present invention provide a display substrate capable of having an increased contrast ratio.

Exemplary embodiments of the present invention also provide a method of manufacturing the display substrate.

According to an exemplary embodiment of the present invention, there is provided a display substrate. The display substrate includes a base substrate, a micro shutter, a first driving electrode, a second driving electrode and a plurality of anchors. The micro shutter is disposed on the base substrate, and includes a plurality of opening parts and a blocking part. The blocking part includes at least two trench structures disposed between an adjacent pair of the opening parts. The first driving electrode is connected to a first side of the micro shutter. The second driving electrode is connected to a second side of the micro shutter opposite to the first side of the micro shutter. The plurality of anchors fixes the first and second driving electrodes and the micro shutter on the base substrate.

In an exemplary embodiment, the micro shutter may include a slope part disposed at an edge portion of the opening part.

In an exemplary embodiment, the slope part may have a positive slope angle with respect to the base substrate.

In an exemplary embodiment, the micro shutter may include a base layer and a low reflection layer having a multi-layered structure and disposed on the base layer.

In an exemplary embodiment, the low reflection layer may include a first layer including aluminum (Al), a second layer including silicon oxide (SiOx), a third layer including titanium (Ti) and a fourth layer including silicon nitride (SiNx).

In an exemplary embodiment, the base layer may include amorphous silicon (a-Si) the base layer.

In an exemplary embodiment, the micro shutter may include an amorphous silicon layer having a thickness of about 3000 Å, an aluminum layer having a thickness of about 1400 Å, a silicon oxide layer having a thickness of about 850 Å, a titanium layer having a thickness of about 150 Å and a silicon nitride layer having a thickness of about 800 Å.

In an exemplary embodiment, the display substrate may further include a storage capacitor disposed between the base substrate and the micro shutter. The storage capacitor includes a first blocking electrode disposed on the based substrate and a second blocking electrode overlapping with the first blocking electrode.

In an exemplary embodiment, the display substrate may further include an insulating disposed on the second blocking electrode and a protecting layer disposed on the insulating layer. The insulating layer and the protecting layer are each formed of silicon nitride.

In an exemplary embodiment, when the second electrode is a multi-layered structure including a titanium layer having a thickness of about 1500 Å, an aluminum layer having a thickness of about 3000 Å and a titanium layer having a thickness of about 100 0 Å, the insulating layer may have a thickness of about 1900 Å and the protecting layer may have a thickness of about 800 Å.

According to another exemplary embodiment of the invention, a method of manufacturing a display substrate, includes forming a first sacrificing layer on a base substrate, a first anchor hole being formed through the first sacrificing layer, forming a second sacrificing layer on the base substrate on which the first sacrificing layer is formed, a second anchor hole overlapping with the first anchor hole and a first trench pattern corresponding to at least two trench structures being formed through the second sacrificing layer on the base substrate on which the first sacrificing layer is formed, partially removing a side wall and a bottom surface of the first trench pattern to form a second trench pattern and a slope pattern at an edge portion of the second trench pattern, forming a low reflection layer having a multilayer on the base substrate on which the slope pattern and the second trench pattern are formed, patterning the low reflection layer to form an anchor and a micro shutter which includes an opening part, a blocking part including at least two trench structures and a slope part. The micro shutter and the anchor are disposed on the base substrate. The method further includes removing the first and second sacrificing layers to form a shutter part which is fixed on the base substrate through the anchor and spaced apart from the base substrate.

In an exemplary embodiment, the slope pattern may be formed by a dry chemical etching the slope pattern.

In an exemplary embodiment, the slope pattern may have a positive slope angle with respect to a surface of the base substrate.

In an exemplary embodiment, the forming the low reflection layer includes forming a base layer including amorphous silicon on the slope pattern, forming a first layer including aluminum on the base layer, forming a second layer including silicon oxide on the first layer, and forming a third layer including titanium on the second layer.

In an exemplary embodiment, the method may further include forming a protecting layer on the base substrate on the shutter part, after the first and second sacrificing layers are removed.

In an exemplary embodiment, the protecting layer may include silicon nitride.

In an exemplary embodiment, the method may further include before the forming of the first sacrificing layer, the forming of a first insulating layer on the base substrate, the forming of a first blocking electrode on the first insulating layer, the forming of a second blocking electrode overlapping with the first blocking electrode, and the forming of a second insulating layer on the second blocking electrode.

In an exemplary embodiment, the second blocking electrode may include a first layer including titanium, a second layer including aluminum and a third layer including titanium.

In an exemplary embodiment, the second insulating layer may include silicon nitride.

According to an exemplary embodiment, a display panel is provided. The display panel includes a display substrate including a first base substrate including a plurality of pixel areas, and each of the pixel areas includes a shutter area and a driving area surrounding the shutter area, a circuit part disposed on the first base substrate, wherein the circuit part includes a plurality of signal lines, a storage capacitor and a plurality of switching elements electrically connected to the signal lines and the storage capacitor, a shutter part including a micro shutter disposed on the first base substrate and including an opening part, and a plurality of blocking parts, a base layer and a multi-layered low reflection layer. The blocking parts each include at least two trench structures and a slope part disposed around an edge portion of the opening part, and with the opening part being disposed between an adjacent pair of the blocking parts. In addition, the base layer and the multi-layered low reflection layer of the micro shutter are sequentially stacked on an inclined sidewall and a bottom portion of the at least two trench structures and on the slope part of the blocking parts.

The display panel further includes a first driving electrode connected to a first side of the micro shutter, a second driving electrode connected to a second side of the micro shutter opposite to the first side of the micro shutter, and a plurality of anchors fixing the first and second driving electrodes and the micro shutter on the base substrate and a light control substrate disposed opposite to the display substrate. The light control substrate includes a second base substrate, a transmitting area and a reflection area, a reflection part composed of a high reflection layer and a low reflection layer sequentially stacked on the second base substrate in the reflection area, and a transmitting hole disposed in a portion of the light control substrate in the transmitting area.

In addition, the display panel further includes a fluid layer disposed in between the display substrate and the light control substrate.

According to the present invention, the light is absorbed into the low reflection layer deposited on the slope side wall and the bottom surface of the trench part included in the micro shutter and the energy of the light is decreased by the slope part disposed at the edge portion of the opening part included in the micro shutter. In addition, the light is absorbed into the area in which the blocking electrode of the circuit part is disposed, so that the light may be prevented from being leaked out.

BRIEF DESCRIPTION OF THE DRAWINGS

Exemplary embodiments of the present invention can be understood in more detail from the following detailed description when taken in conjunction with the accompanying drawings, in which.

DETAILED DESCRIPTION OF EXEMPLARY EMBODIMENTS OF THE INVENTION

Hereinafter, Exemplary embodiments of the present invention will be explained in detail with reference to the accompanying drawings.

Figure 1:
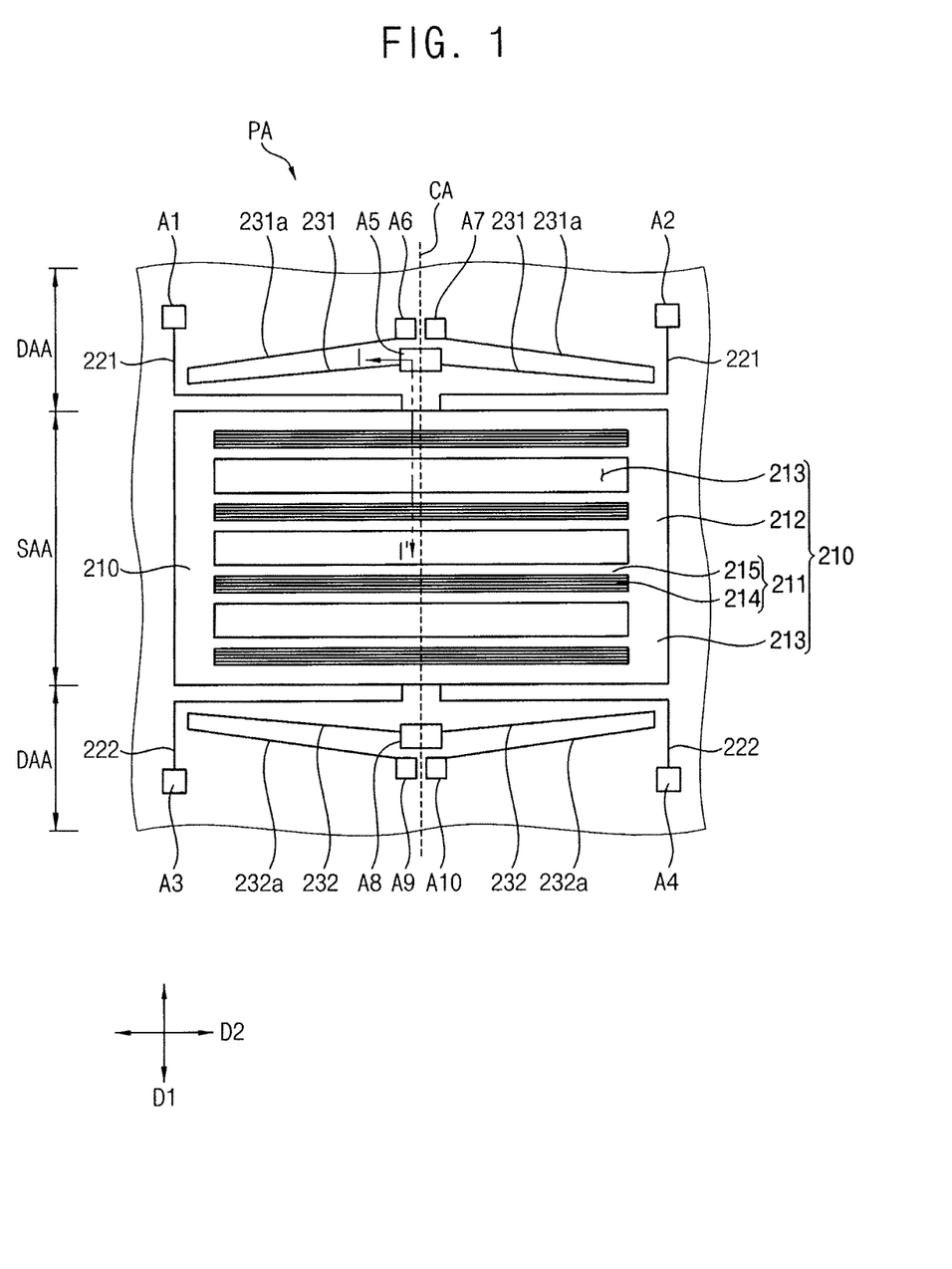
FIG. 1 is a plan view illustrating a display panel according to an exemplary embodiment of the present invention.
Figure 2:
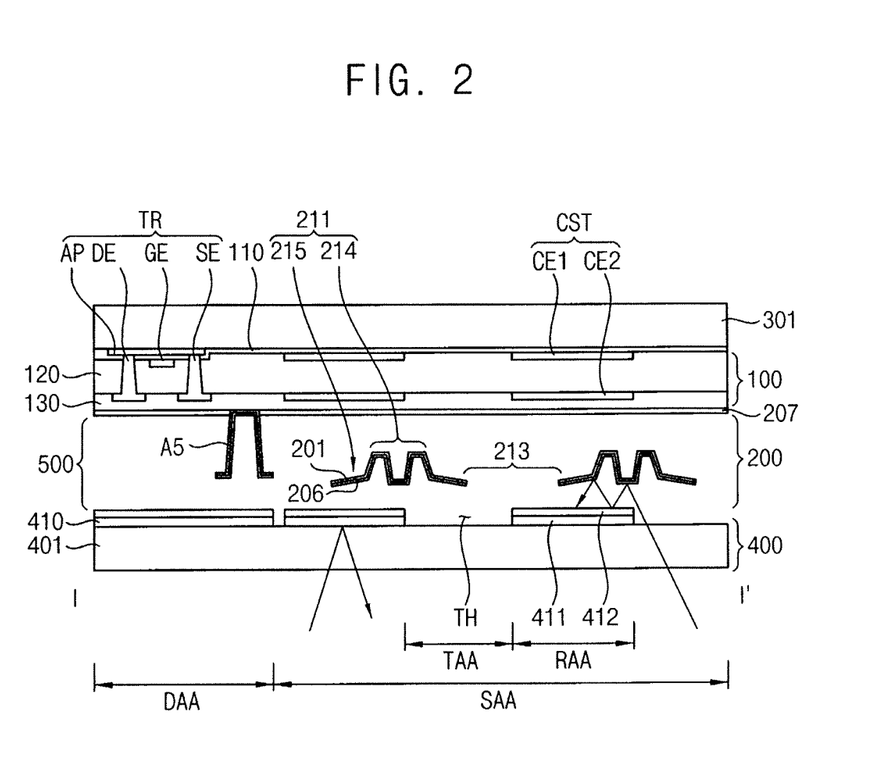
FIG. 2 is a cross-sectional view taken along a line I-I' of FIG. 1.

FIG. 1 is a plan view illustrating a display panel according to an exemplary embodiment of the present invention. FIG. 2 is a cross-sectional view taken along a line I-I' of FIG. 1.

Referring to FIGS. 1 and 2, the display panel includes, for example, a display substrate 300, a light control substrate 400 formed opposite to the display substrate 300 and a fluidic layer 500 provided between the display substrate 300 and the light control substrate 400 to occupy a space between the display substrate 300 and the light control substrate 400. The fluidic layer may be composed of, for example, a gas (e.g. air) or oil.

The display substrate 300 includes, for example, a first base substrate 301, a circuit part 100 and a shutter part 200.

The first base substrate 301 includes, for example, a plurality of pixel areas PA, and each pixel area PA includes a shutter area SAA and a driving area DAA surrounding the shutter area SAA. The circuit part 100 is disposed on the first base substrate 301. The shutter part 200 is disposed on the first base substrate 301 on which the circuit part 100 is disposed.

The circuit part 100 includes, for example, a plurality of signal lines (not shown), a plurality of switching elements TR electrically connected to the signal lines and the storage capacitor CST. The signal lines and the switching elements TR are disposed in the driving area DAA of the first base substrate 301 and the storage capacitor CST is disposed in the shutter area SAA of the first base substrate 301. The switching element TR includes, for example, a gate electrode GE, an active pattern AP, a source electrode SE and a drain electrode DE. The storage capacitor CST includes, for example, a plurality of first blocking electrodes CE1 and a plurality of second blocking electrodes CE2 overlapping with the first blocking electrodes CE1. Each of the first blocking electrodes CE1 and the second blocking electrodes CE2 is extended along, for example, the second direction D2 and arranged along the first direction D1. It is noted that in an exemplary embodiment of the present invention each of the first blocking electrodes CE1 and the second blocking electrodes CE2 may be formed of a material including chromium (Cr), aluminum (Al), tantalum (Ta), molybdenum (Mo), titanium (Ti), tungsten (W), copper (Cu), silver (Ag), or alloys thereof. In addition, in an exemplary embodiment, the first blocking electrode CE1 and the second blocking electrode CE2 may each have a multi-layered structure including a first metal layer including chromium (Cr), aluminum (Al), tantalum (Ta), molybdenum (Mo), titanium (Ti), tungsten (W), copper (Cu), silver (Ag), etc or alloy thereof, a second metal layer including a first metal layer including chromium (Cr), aluminum (Al), tantalum (Ta), molybdenum (Mo), titanium (Ti), tungsten (W), copper (Cu), silver (Ag), etc or alloy thereof and a third metal layer including chromium (Cr), aluminum (Al), tantalum (Ta), molybdenum (Mo), titanium (Ti), tungsten (W), copper (Cu), silver (Ag), or alloys thereof. Further, in accordance with exemplary embodiments of the present invention, oxides or nitrides of any of the above-mentioned materials may also be used to form layer or layers of the first blocking electrode CE1 and the second blocking electrode CE2

The circuit part 100 further includes, for example, a first insulating layer 110, a second insulating layer 120 and a third insulating layer 130. For example, in the present exemplary embodiment, the first insulating layer 110, the second insulating layer 120 and the third insulating layer 130 may each include silicon nitride. However, the first insulating layer 110, the second insulating layer 120 and the third insulating layer 130 may alternatively include other insulators including but not limited to silicon dioxide or a combination of silicon dioxide and silicon nitride in accordance with exemplary embodiments of the present invention. The first insulating layer 110 is disposed on the first base substrate 301 on which the active pattern AP is disposed, to cover the active pattern AP. The second insulating layer 120 is disposed on the first base substrate 301 on which the gate electrode GE and the first blocking electrode CE1 are disposed, to cover the gate electrode GE and the first blocking electrode CE1. The third insulating layer 130 is disposed on the first base substrate 301 on which the source electrode SE, the drain electrode DE and the second blocking electrode CE2 are disposed, to cover the source electrode SE, the drain electrode DE and the second blocking electrode CE2.

A thickness of the third insulating layer 130 may be adjusted so that an area in which the second blocking electrode CE2 is disposed, may obtain a low reflection characteristic. For example, a characteristic and a thickness of a metal material forming the second blocking electrode CE2 and a characteristic and a thickness of an insulation material forming the third insulating layer 130 may be adjusted so that the area in which the second blocking electrode CE2 is disposed may obtain the low reflection characteristic. Therefore, the second blocking electrode CE2 may absorb a light hitting thereto so that the light may be prevented from being leaked out.

The shutter part 200 includes, for example, a micro shutter 210, a plurality of driving electrodes 221 and 222, a plurality of reference electrodes 231 and 232 and a plurality of anchors A1-A10.

The micro shutter 210 is disposed in the shutter area SAA. The micro shutter 210 includes, for example, a plurality of blocking parts 211, a connection part 212 connected to the blocking parts 211, and an opening part 213 located between an adjacent pair of the blocking parts 211. The opening part 213 may be defined by the blocking part 211 and the connection part 212.

The blocking part 211 is arranged, for example, along the first direction D1 along which the micro shutter 210 is moved and is extended along the second direction D2 crossing the first direction D1. Each blocking part 211 includes, for example, a trench part 214 including at least two trench structures and a slope part 215 disposed around an edge portion of the opening part 213.

The trench part 214 is extended along, for example, the second direction D2 and prevents the micro shutter 210 from being bent. For example, the trench part 214 may include a first trench 214a and a second trench 214b. The slope part 215 includes, for example, a slope surface which slopes from the trench part 214 or the connection part 212 toward the opening part 213. Therefore, the slope part 215 slopes toward the light control substrate 400.

In addition, the micro shutter 210 includes, for example, a base layer 201 and a low reflection layer 206. The base layer 201 is a base layer of the micro shutter 210 and may include, for example, amorphous silicon. The low reflection layer 206 has, for example, a multi-layered structure of the low reflection characteristic. For example, the low reflection layer 206 may include an aluminum layer, a silicon oxide layer, a titanium layer and a silicon nitride layer. The titanium layer and aluminum layer of the low reflection layer 206 may include, alloys, nitrides or oxides of titanium and aluminum, respectively. It is further noted that exemplary embodiments of the present invention are not limited to the above materials for the low reflective layer 206. For example, the aluminum layer of low reflective layer 206 may alternatively be substituted with a layer formed of chromium or silver, as well as alloys, nitrides or oxides thereof.

The trench part 214 includes, for example, at least two trench structures 214a and 214b which include an inclined side wall and a bottom surface. The low reflection layer 206 deposited on the at least two trench structures 214a and 214b having the inclined side wall according to the present exemplary embodiment may obtain a more uniform thickness in comparison with that deposited on a trench structure including a vertical side wall. Therefore, the low reflection layer 206 according to the present exemplary embodiment may prevent the light from leaking out.

In addition, the slope part 215 is disposed at the edge portion of the opening part 213 and slopes toward the light control substrate 400. The number of times that light is reflected between the light control substrate 400 and the slope part 215 may be increased so that the energy of the light may be decreased. In addition, the slope part 215 reflects the light toward the light control substrate 400 so that the light may be prevented from being leaked out.

The connection part 212 is extended along the first direction D1 and connects end portions of an adjacent pair of the blocking parts 211 to each other.

The driving electrodes 221 and 222 are disposed in the driving area DAA. The first driving electrode 221 is connected to a first side of the micro shutter 210 and the second driving electrode 222 is connected to a second side of the micro shutter 210. For example, each of the first and second driving electrodes 221 and 222 may have a Y-shape symmetrical with respect to a central axis CA of the micro shutter 210.

The reference electrodes 231 and 232 are disposed in the driving area DAA. The first reference electrode 231 is spaced apart from the first driving electrode 221 and the second reference electrode 232 is spaced apart from the second driving electrode 222. For example, each of the first and second reference electrodes 231 and 232 may have a Y-shape symmetrical with respect to the central axis CA. The first reference electrode 231 may further include, for example, a first extending electrode 231a connected to the first reference electrode 231 and substantially parallel to the first reference electrode 231. The second reference electrode 232 may further include, for example, a second extending electrode 232a connected to the second reference electrode 232 and substantially parallel to the second reference electrode 232. The first and second extending electrodes 231a and 232a reinforce the first and second reference electrodes 231 and 232 against an elastic force. It is noted that the first and second driving electrodes 221, 222 and the first and second reference electrodes 231 and 232 are not limited to above-mentioned Y-shape but rather the first and second driving electrodes 221, 222 and the first and second reference electrodes 231 and 232 may be formed in various other shapes in accordance with exemplary embodiments of the present invention. In addition, the directions of the first and second extending electrodes 231a, 232a in relation to the first and second reference electrodes 231, 232, respectively may also be varied in accordance with exemplary embodiments of the present invention.

The anchors A1-A10 are disposed in the driving area DAA, and fix the first driving electrode 221, the second driving electrode 222, the first reference electrode 231 and the second reference electrode 232 on the first base substrate 301.

The first and second anchors A1 and A2 fix end portions of the first driving electrode 221 on the first base substrate 301, and apply a driving voltage to the first driving electrode 221. The third and fourth anchors A3 and A4 fix end portions of the second driving electrode 222 on the first base substrate 301, and apply a driving voltage to the second driving electrode 222.

The fifth anchor A5 fixes the first reference electrode 231 on the first base substrate 301, and applies a reference voltage to the first reference electrode 231. The sixth and seventh anchors A6 and A7 fix end portions of the first extending electrode 231a on the first base substrate 301. A reference voltage may be applied to the sixth and seventh anchors A6 and A7. The eighth anchor A8 fixes the second reference electrode 232 on the first base substrate 301, and applies a reference voltage to the second reference electrode 232. The ninth and tenth anchors A9 and A10 fix end portions of the second extending electrode 232a on the first base substrate 301. A reference voltage may be applied to the ninth and tenth anchors A9 and A10.

The shutter part 200 further includes a protecting layer 207 covering the micro shutter 210, the driving electrodes 221 and 222, the reference electrodes 231 and 232 and the anchors A1-A10 which are disposed on the first base substrate 301. The low reflection layer 206 of the micro shutter 210 may include a layer formed of, for example, the same material as the protecting layer 207. It is noted that the number of anchors set forth above was by way of example only and that exemplary embodiments of the present invention are not limited to the above-mentioned number of anchors. Alternatively, for example, the number of anchors may be varied to include either more or less than 10 anchors in accordance with exemplary embodiments.

The light control substrate 400 includes, for example, a second base substrate 401 and a reflection part 410.

The second base substrate 401 includes, for example, a transmitting area TAA and a reflection area RAA.

The reflection part 410 is disposed in the reflection area RAA and a transmitting hole TH is disposed in the transmitting area TAA. For example, the reflection area RAA is an area in which the storage capacitor CST is disposed. The reflection part 410 may include, for example, a high reflection layer 411 disposed on the second base substrate 401 and a low reflection layer 412 disposed on the high reflection layer 411.

In addition, the reflection part 410 may be disposed in the driving area DAA of the first base substrate 301.

The high reflection layer 411 has a high reflection characteristic. The high reflection layer 411 reflects the light which is not transmitted through the transmitting hole TH of the second base substrate 401 toward a backlight unit to recycle the light. The low reflection layer 412 has a low reflection characteristic. The low reflection layer 412 absorbs the light reflected from the micro shutter 210 so that the light is prevented from being leaked out.

It is noted that the processes, materials and layer thicknesses set forth in Examples 1 and 2 described in connection with each of FIGS. 3A, 3B, 4A, 4B, 5A, 5B, 6A and 6B discussed hereinafter are by way of example only and exemplary embodiments of the present invention are not limited thereto.

Figure 3A:
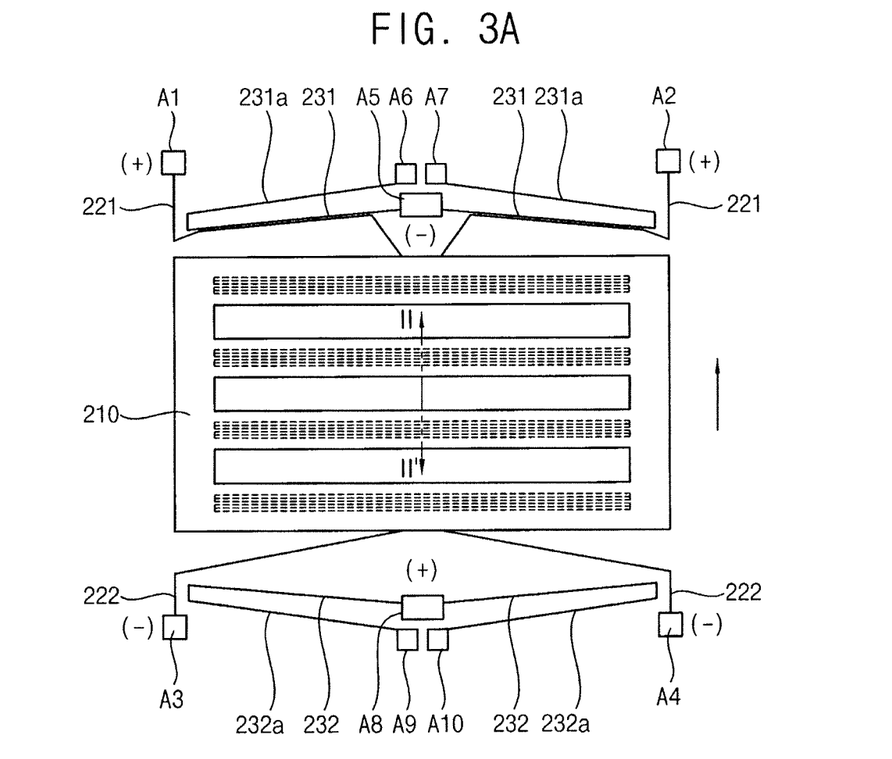
FIGS. 3A and 3B are conceptual diagrams to explain an opening operation of a shutter part of FIG. 1 in accordance with an exemplary embodiment of the present invention.
Figure 3B:
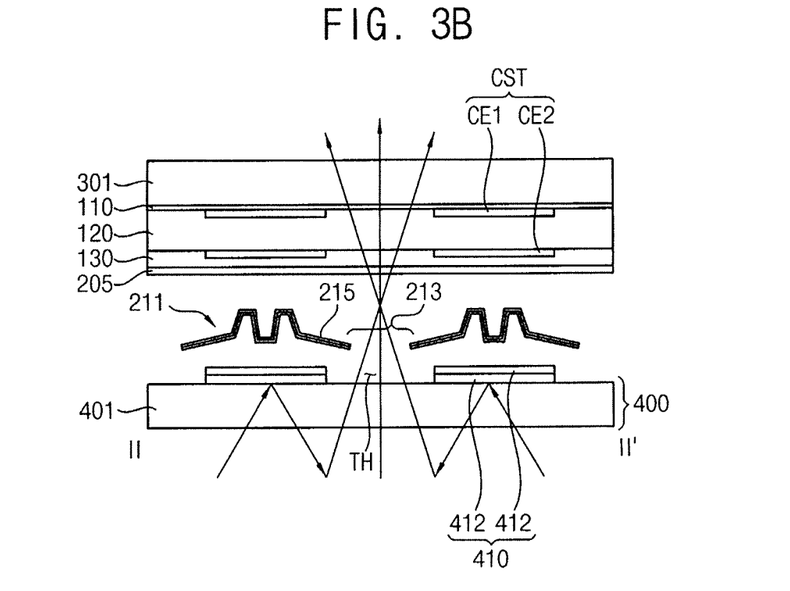

FIGS. 3A and 3B are conceptual diagrams to explain an opening operation of a shutter part of FIG. 1.

Referring to FIGS. 1, 3A and 3B, a reference voltage of a low level (−) is applied to the first and second reference electrodes 231 and 232. A voltage which is substantially the same as the reference voltage of the low level (−) is applied to the second driving electrode 222. However, a driving voltage of a high level (+) which is different from the reference voltage is applied to the first driving electrode 221.

Due to an electrostatic force, the first driving electrode 221 and the first reference electrode 231 receiving voltages different from each other pull each other. The second driving electrode 222 and the second reference electrode 232 receiving voltages equal to each other push each other. The micro shutter 210 is moved toward the first reference electrode 231.

Due to the above-mentioned voltages received by the first driving electrode 221, the first reference electrode 231, the second driving electrode 222 and the second reference electrode 232, the micro shutter 210 is moved toward the first reference electrode 231, so that the opening part 213 overlaps with the transmitting hole TH of the light control substrate 400

As a result, the light which is generated from the backlight unit passes through the transmitting hole TH of the light control substrate 400 and the opening part 213 of the micro shutter 210 overlapping with the transmitting hole TH to the outside of the display panel. For example, when the light which is generated from the backlight unit is a white light, the display panel may display a white image, and when the light which is generated from the backlight unit is a red light, the display panel may display a red image. In addition, for example, when the light which is generated from the backlight unit is a green light, the display panel may display a green image, and when the light which is generated from the backlight unit is a blue light, the display panel may display a blue image.

Figure 4A:
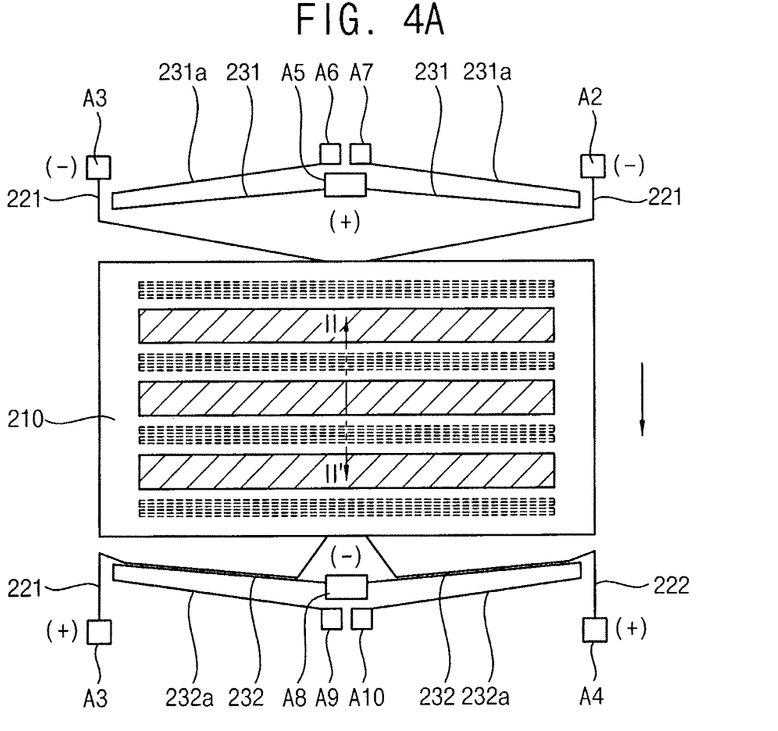
FIGS. 4A and 4B are conceptual diagrams to explain a closing operation of the shutter part of FIG. 1 in accordance with an exemplary embodiment of the present invention.
Figure 4B:
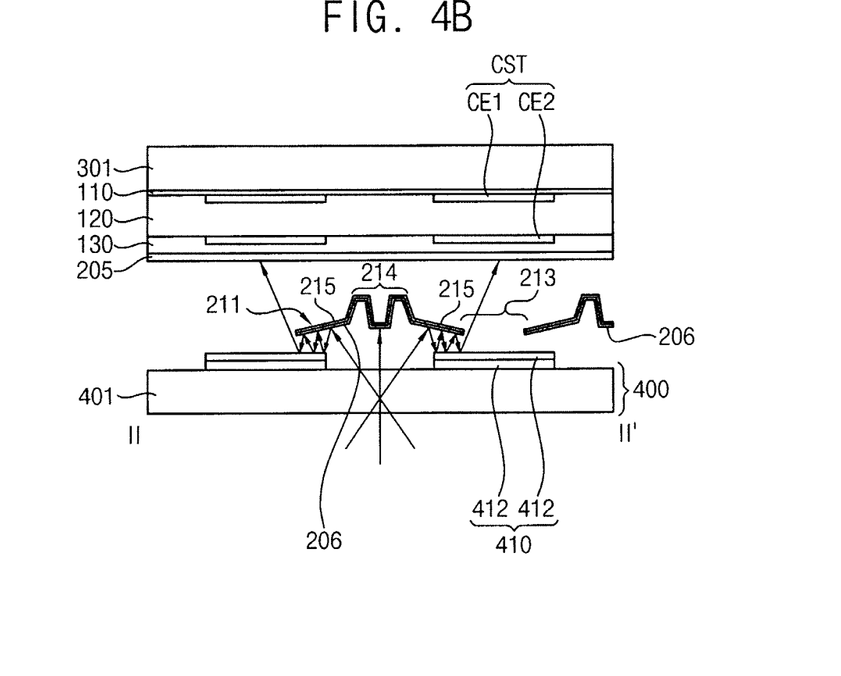

FIGS. 4A and 4B are conceptual diagrams to explain a closing operation of the shutter part of FIG. 1.

Referring to FIGS. 1, 4A and 4B, a reference voltage of a low level (−) is applied to the first and second reference electrodes 231 and 232. A voltage which is the substantially same as the reference voltage of the low level (−) is applied to the first driving electrode 221. However, a driving voltage of a high level (+) which is different from the reference voltage is applied to the second driving electrode 222.

Due to the electrostatic force, the second driving electrode 222 and the second reference electrode 232 receiving voltages different from each other pull each other. The first driving electrode 221 and the first reference electrode 231 receiving voltages equal to each other, push each other. The micro shutter 210 is moved toward the second reference electrode 232 due to the above-mentioned voltages received by the first driving electrode 221, the first reference electrode 231, the second driving electrode 222 and the second reference electrode 232.

The micro shutter 210 is moved toward the second reference electrode 232 so that the opening part 213 overlaps with the reflection part 410 of the light control substrate 400.

As a result, the light which is generated from the backlight unit passes through the transmitting hole TH, and the light transmitted through the transmitting hole TH is blocked by the blocking part 211 of the micro shutter 210.

For example, the light transmitted through the transmitting hole TH is absorbed into the low reflection layer 206 uniformly deposited at the slope side wall and the bottom surface of the trench part 214, so that the light may be prevented from being leaked out.

In addition, the slope part 215 which is the edge portion of the blocking part 211 defining the opening part 213 slopes toward the light control substrate 400. The number of times that light is reflected between the light control substrate 400 and the slope part 215 may be increased so that the energy of the light may be decreased. In addition, the slope part 215 reflects the light toward the light control substrate 400 so that the light may be prevented from being leaked out.

For example, the characteristic and the thickness of the metal material forming the second blocking electrode CE2 and the characteristic and the thickness of the insulation material forming the third insulating layer 130 may be adjusted so that the area in which the second blocking electrode CE2 is disposed may obtain the low reflection characteristic. Therefore, the second blocking electrode CE2 may absorb a light hitting thereto so that the light may be prevented from being leaked out.

As described above, the light generated from the backlight unit passes through the transmitting hole TH and the light transmitted through the transmitting hole TH is absorbed into the low reflection layer 206 deposited at the slope side wall and the bottom surface of the trench part 214. The number of times that the light is reflected at a slope surface of the slope part 215 may be increased so that the energy of the light may be decreased. The light hitting the area on which the second blocking electrode CE2 having the low reflection characteristic is disposed, is absorbed, so that the light may be prevented from being leaked out.

Therefore, a contrast ratio of an image may be increased, so that the display panel may obtain a wide viewing angle.

Figure 5A:
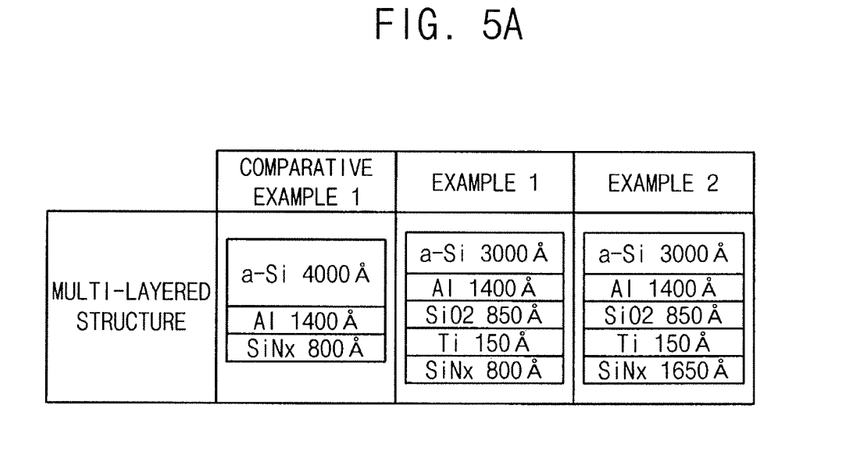
FIGS. 5A and 5B are conceptual diagrams to explain layers included in the micro shutter of FIG. 2 in accordance with an exemplary embodiment of the present invention.
Figure 5B:
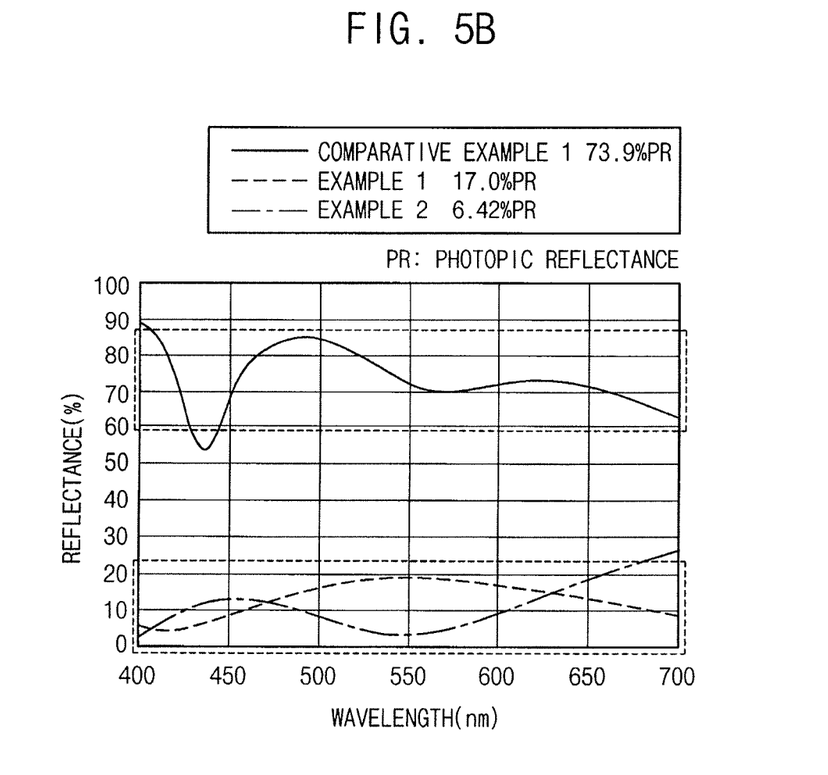

FIGS. 5A and 5B are conceptual diagrams to explain layers included in the micro shutter of FIG. 2.

Referring to FIGS. 2, 5A and 5B, a micro shutter according to Comparative Example 1 includes an amorphous silicon (a-Si) layer having a thickness of about 4000 Å, an aluminum (Al) layer having a thickness of about 1400 Å and a silicon nitride (SiNx) layer having a thickness of about 800 Å which are stacked with each other.

A micro shutter according to Example 1 includes an amorphous silicon (a-Si) layer having a thickness of about 3000 Å, an aluminum (Al) layer having a thickness of about 1400 Å, a silicon oxide (SiO$_2$) layer having a thickness of about 850 Å, a titanium (Ti) layer having a thickness of about 150 Å and a silicon nitride (SiNx) layer having the thickness of about 800 Å which are sequentially stacked with each other.

A micro shutter according to Example 2 includes an amorphous silicon (a-Si) layer having the thickness of about 3000 Å, an aluminum (Al) layer having the thickness of about 1400 Å, a silicon oxide (SiO2) layer having the thickness of about 850 Å, a titanium (Ti) layer having the thickness of about 150 Å and a silicon nitride (SiNx) layer having the thickness of about 1650 Å which are stacked with each other.

A reflectivity according to a wavelength range of the micro shutters was measured for Comparative Example 1, Example 1 and Example 2 shown in FIG. 5A.

Referring to FIG. 5B, the micro shutter according to Comparative Example 1 had a reflectivity in a range between about 60% and about 90%, and a difference of the reflectivity according to the wavelength range was relatively large. A photopic reflectance (PR) according to Comparative Example 1 was about 73.9%.

The micro shutter according to Example 1 and Example 2 had a reflectivity in a range between about 5% and about 20%, and a difference of the reflectivity according to the wavelength range was relatively small. In addition, the photopic reflectance (PR) according to Example 1 was about 17.0% and the photopic reflectance (PR) according to Example 2 was about 6.42%.

The low reflection characteristic in Example 1 and Example 2 may be increased in comparison with that in Comparative Example 1, and the low reflection characteristic in Example 2 may be increased in comparison with that in Example 1.

As described above, the micro shutter 210 has a multi-layered structure so that the low reflection characteristic may be increased.

Figure 6A:
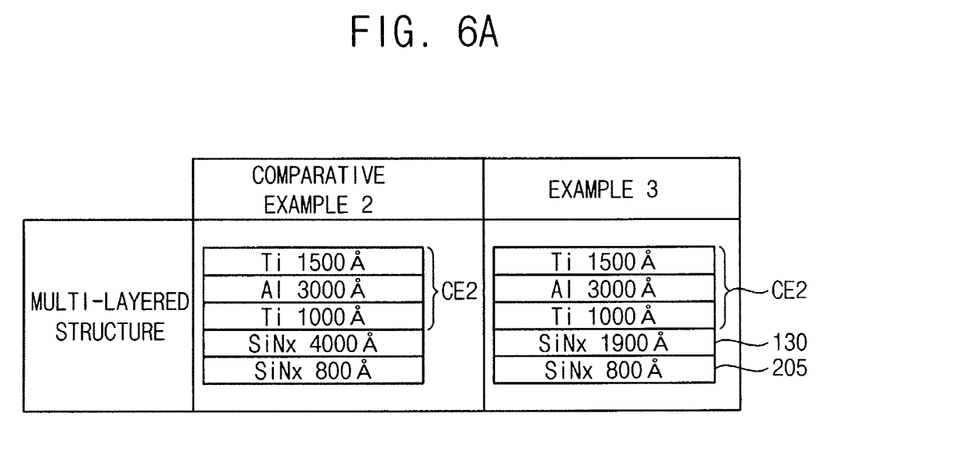
FIGS. 6A and 6B are conceptual diagrams to explain layers on a second blocking electrode of FIG. 2 in accordance with an exemplary embodiment of the present invention.
Figure 6B:
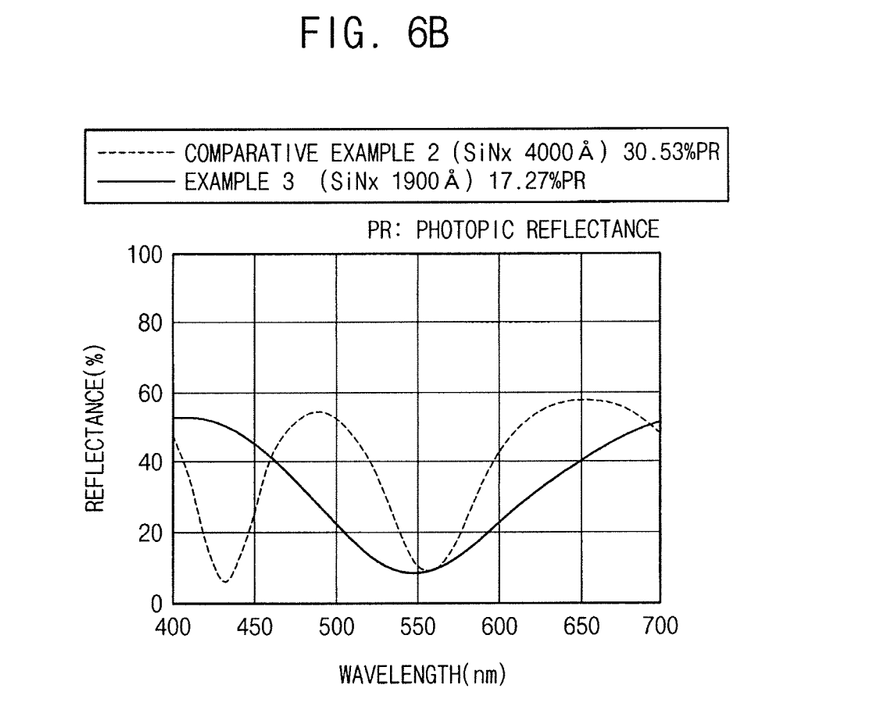

FIGS. 6A and 6B are conceptual diagrams to explain layers on a second blocking electrode of FIG. 2.

Referring to FIGS. 2, 6A and 6B, according to Comparative Example 2, the second blocking electrode CE2 is a three-layered structure including a titanium (Ti) layer, an aluminum (Al) layer and a titanium (Ti) layer which are sequentially stacked. A first layer of the second blocking electrode CE2 is the titanium (Ti) layer having a thickness of about 1500 Å. A second layer of the second blocking electrode CE2 is the aluminum (Al) layer having a thickness of about 3000 Å. A third layer of second blocking electrode CE2 is the titanium (Ti) layer having a thickness of about 1000 Å. A third insulating layer and a protecting layer are disposed on the second blocking electrode CE2. The third insulating layer is a silicon nitride (SiNx) layer having a thickness of about 4000 Å and is disposed on the second blocking electrode CE2. The protecting layer is a silicon nitride (SiNx) layer having a thickness of about 800 Å and is disposed on the third insulating layer.

According to Example 3, the second blocking electrode CE2 is a three-layered structure including a titanium (Ti) layer, an aluminum (Al) layer and a titanium (Ti) layer which are sequentially stacked. A first layer of the second blocking electrode CE2 is the titanium (Ti) layer having a thickness of about 1500 Å. A second layer of the second blocking electrode CE2 is the aluminum (Al) layer having a thickness of about 3000 Å. A third layer of second blocking electrode CE2 is the titanium (Ti) layer having a thickness of about 1000 Å. A third insulating layer and a protecting layer are disposed on the second blocking electrode CE2. The third insulating layer is a silicon nitride (SiNx) layer having a thickness of about 1900 Å and is disposed on the second blocking electrode CE2. The protecting layer is a silicon nitride (SiNx) layer having a thickness of about 800 Å and is disposed on the third insulating layer.

A reflectivity according to a wavelength range of the micro shutters was measured for Comparative Example 2 and Example 3 shown in FIG. 6A.

Referring to FIG. 6B, the micro shutter according to Comparative Example 2 had a reflectivity in a range between about 10% and about 60%, and a difference of the reflectivity according to the wavelength range was relatively large. The photopic reflectance (PR) according to Comparative Example 2 was about 30.53%.

The micro shutter according to Example 3 had a reflectivity in a range between about 10% and about 60%, and a difference of the reflectivity according to the wavelength range was relatively small. In addition, the photopic reflectance (PR) according to Example 3 was about 17.27% which is less than that of Comparative Example 3. As a result, the photopic reflectance (PR) according to Example 3 was less than that of Comparative Example 3.

As described above, the thickness of the third insulating layer 130 which is disposed on the second blocking electrode CE2 may be decreased so that the row reflection characteristic may be increased.

FIGS. 7A to 7H are cross-sectional views to explain a method for manufacturing the display substrate of FIG. 2 in accordance with an exemplary embodiment of the present invention.

Figure 7A:
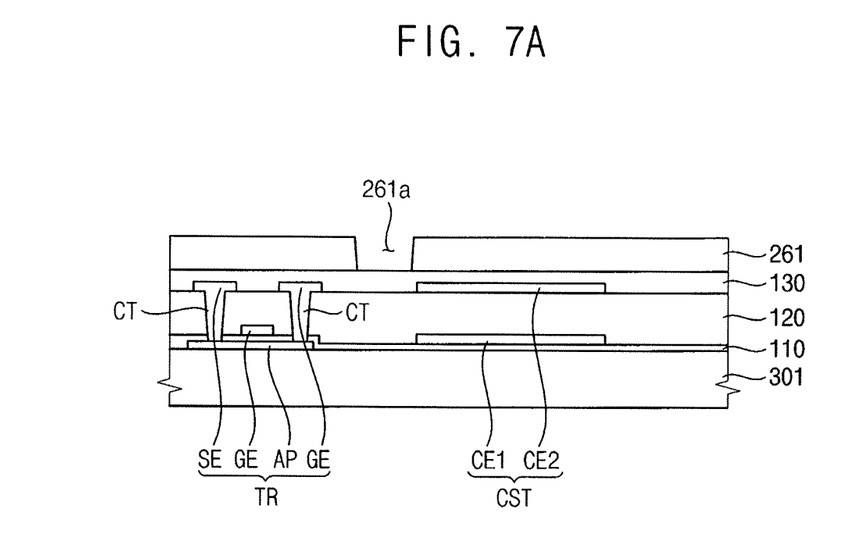
FIGS. 7A to 7H are cross-sectional views to explain a method for manufacturing the display substrate of FIG. 2 in accordance with an exemplary embodiment of the present invention.

Referring to FIGS. 1 and 7A, the active pattern AP of the switching element TR is formed on the first base substrate 301. A first insulating layer 110 is formed on the first base substrate 301 on which the active pattern AP is formed.

A first metal layer is patterned to form a gate electrode GE of the switching element TR and the first blocking electrode CE1 of the storage capacitor CST. The gate electrode GE and the first blocking electrode CE1 are formed on the first base substrate 301 on which the first insulating layer 110 is formed. The first metal layer includes metal such as, for example, chromium (Cr), aluminum (Al), tantalum (Ta), molybdenum (Mo), titanium (Ti), tungsten (W), copper (Cu), silver (Ag), etc or alloys, thereof. Moreover, the first metal layer may alternatively include oxides or nitrides of any of the above-mentioned metals. In addition, the first metal layer may include, for example, two or more layers having physical characteristics different from each other. For example, the first metal layer may have a three-layered structure such as titanium (Ti) layer/aluminum (Al) layer/titanium (Ti) layer.

A second insulating layer 120 is formed on the first base substrate 301 on which the gate electrode GE and the first blocking electrode CE1 of the storage capacitor CST are formed. The first and second insulating layers 110 and 120 are etched to form a plurality of contact holes CT. A second metal layer is patterned into source and drain electrodes SE and DE of the switching element TR and the second blocking electrode CE2 of the storage capacitor CST. The source and drain electrodes SE and DE and the second blocking electrode CE2 are formed on the first base substrate 301 on which the contact holes CT are formed. The source electrode SE and the drain electrode DE are contacted with the active pattern AP through the contact holes CT. The second blocking electrode CE2 overlaps with the first blocking electrode CE1.

The second metal layer includes metal such as, for example, chromium (Cr), aluminum (Al), tantalum (Ta), molybdenum (Mo), titanium (Ti), tungsten (W), copper (Cu), silver (Ag), etc or alloys thereof. Moreover, the second metal layer may alternatively include oxides or nitrides of any of the above-mentioned metals. In addition, the first metal layer may include, for example, two or more layers having physical characteristics different from each other. For example, the first metal layer may have the three-layered structure such as titanium (Ti) layer/aluminum (Al) layer/titanium (Ti) layer.

The third insulating layer 130 is formed on the first base substrate 301 on which the source electrode SE, the drain electrode DE and the second blocking electrode CE2 are formed. The third insulating layer 130 may be, for example, the silicon nitride (SiNx) layer. The third insulating layer 130 may be formed with a preset thickness so that the area in which the second blocking electrode CE2 is formed may obtain the row reflection characteristic. For example, when the second blocking electrode CE2 is a three-layered structure including a titanium (Ti) layer having a thickness of about 1500 Å, an aluminum (Al) layer having a thickness of about 3000 Å and a titanium (Ti) layer having a thickness of about 1000 Å, the third insulating layer 130 may be formed of a silicon nitride (SiNx) layer having a thickness of about 1900 Å.

As described above, the circuit part 100 of the display substrate 300 is formed on the first base substrate 301.

A first sacrificing layer 261 is formed on the first base substrate 301 on which the third insulating layer 130 is formed. The first sacrificing layer 261 is patterned to form a first anchor hole 261a. The first anchor hole 261a is formed in an area in which each of the anchors A1-A10 is formed.

Figure 7B:
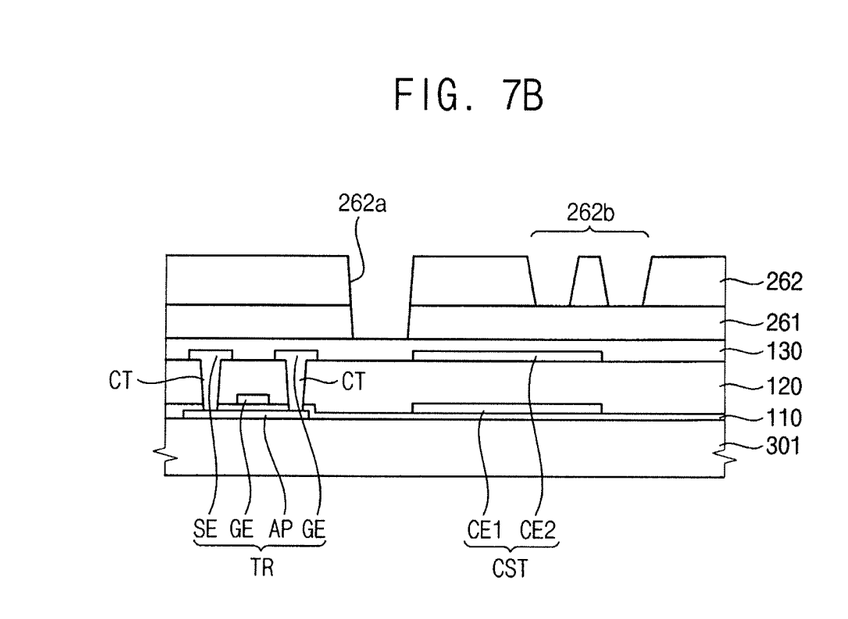

Referring to FIGS. 1 and 7B, a second sacrificing layer 262 is formed on the first base substrate 301 on which the first anchor hole 261a is formed. The second sacrificing layer 262 is patterned to form a second anchor hole 262a and a first trench pattern 262b. The second anchor hole 262a is formed in an area in which the first anchor hole 261a is formed. The first trench pattern 262b is formed in an area in which at least two trench structures 214a and 214b included in the trench part 214 are formed.

Figure 7C:
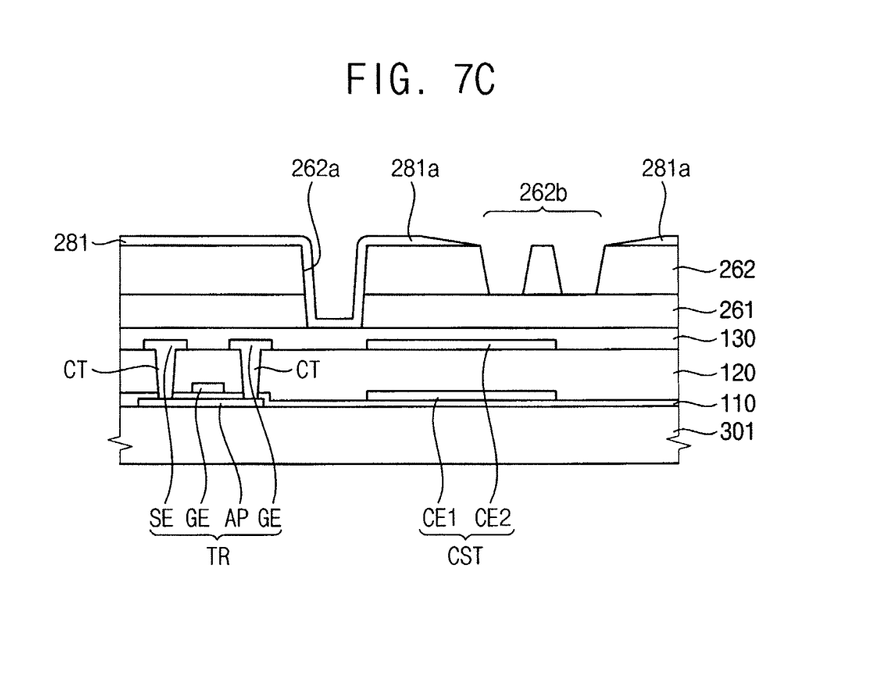
Figure 7D:
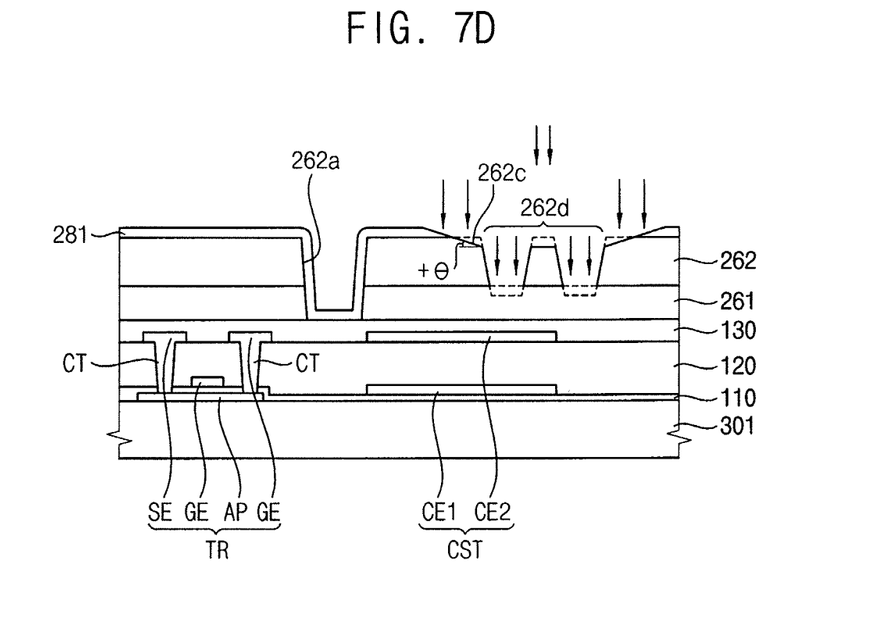

Referring to FIGS. 1, 7C and 7D, a first mask pattern 281 is formed on the first base substrate 301 on which the second anchor hole 262a and the trench pattern 262b are formed. Thus, the first mask pattern 281 is formed on the second sacrificing layer 262, and the first trench pattern 262b is exposed through the first mask pattern 281.

The first mask pattern 281 includes, for example, a reflow pattern 281a which is gently sloped. The reflow pattern 281a is disposed at an edge portion of the first trench pattern 262b corresponding to the edge portion of the opening part 213. The second sacrificing layer 262 is etched using, for example, dry chemical etching to form a slope pattern 262c at the edge portion of the first trench pattern 262b. The slope pattern 262c has a positive slope angle with respect to the first base substrate 301. For example, the slope pattern 262c may be formed in an area in which the edge portion of the opening part 213 is formed.

In addition, the side wall and the bottom surface of the first trench pattern 262b exposed through the first mask pattern 281 are partially etched using, for example, dry chemical etching to form a second trench pattern 262d. Then, the first mask pattern 281 is removed.

Figure 7E:
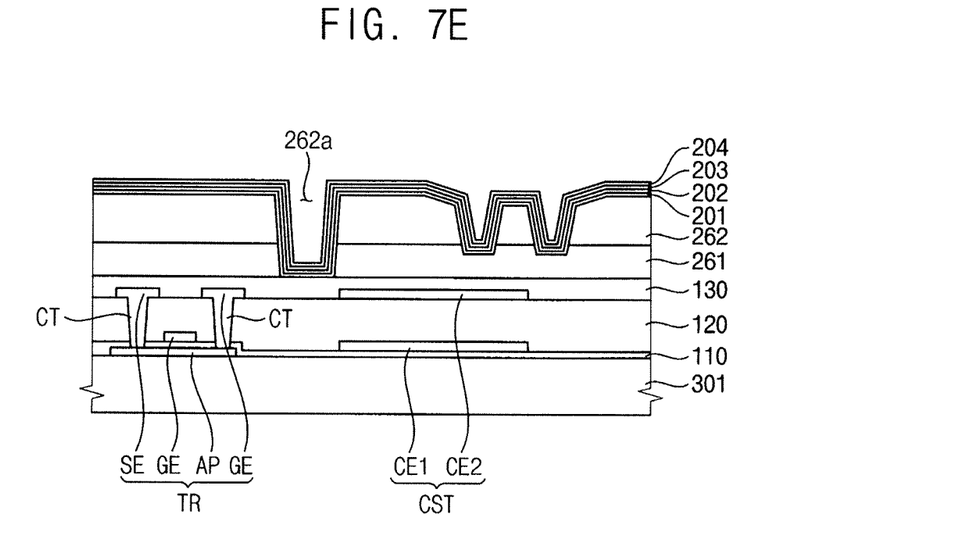

Referring to FIGS. 1 and 7E, the base layer 201 and the low reflection layer 206 are formed on the first base substrate 301 on which the second anchor hole 262a, the slope pattern 262c and the second trench pattern 262d are formed. The base layer 201 is contacted with the third insulating layer 130 of the circuit part 100 through the first and second anchor holes 261a and 262a. The low reflection layer 206 is adhered to the circuit part 100 through the base layer 201. The low reflection layer 206 has, for example, a multi-layered structure.

For example, the base layer 201 may be an amorphous silicon (a-Si) layer having a thickness of about 3000 Å. The low reflection layer 206 has the multi-layered structure which includes, for example, an aluminum (Al) layer 202 having a thickness of about 1400 Å, a silicon oxide (SiO$_2$) layer 203 having a thickness of about 850 Å, a titanium (Ti) layer 204 having a thickness of about 150 Å and a silicon nitride (SiNx) layer 205 having a thickness of about 800 Å. Alternatively, the low reflection layer 206 has a multi-layered structure which includes, for example, an aluminum (Al) layer 202 having a thickness of about 1400 Å, a silicon oxide (SiO$_2$) layer 203 having a thickness of about 850 Å, a titanium (Ti) layer 204 having a thickness of the 150 Å and a silicon nitride (SiNx) layer 205 having a thickness of about 1650 Å.

Figure 7F:
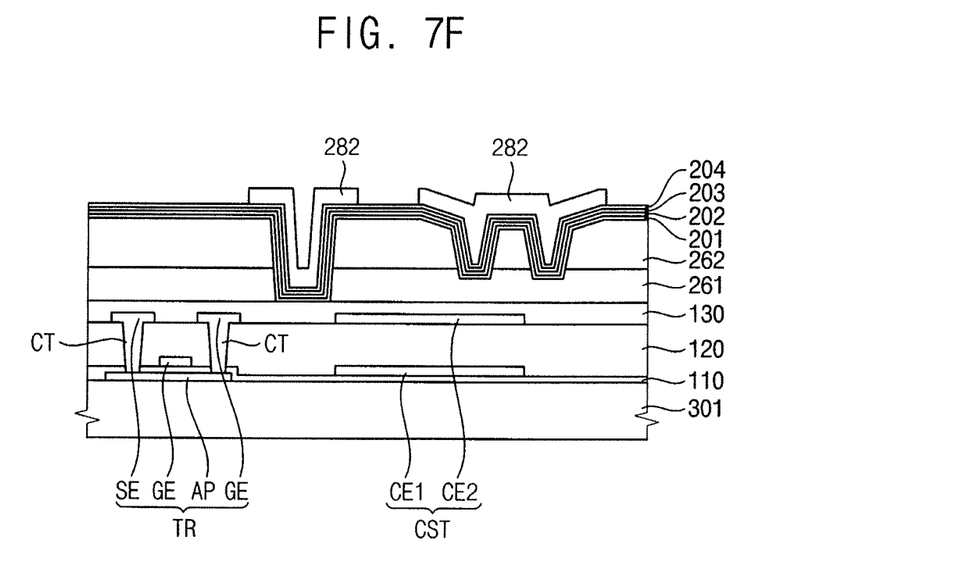
Figure 7G:
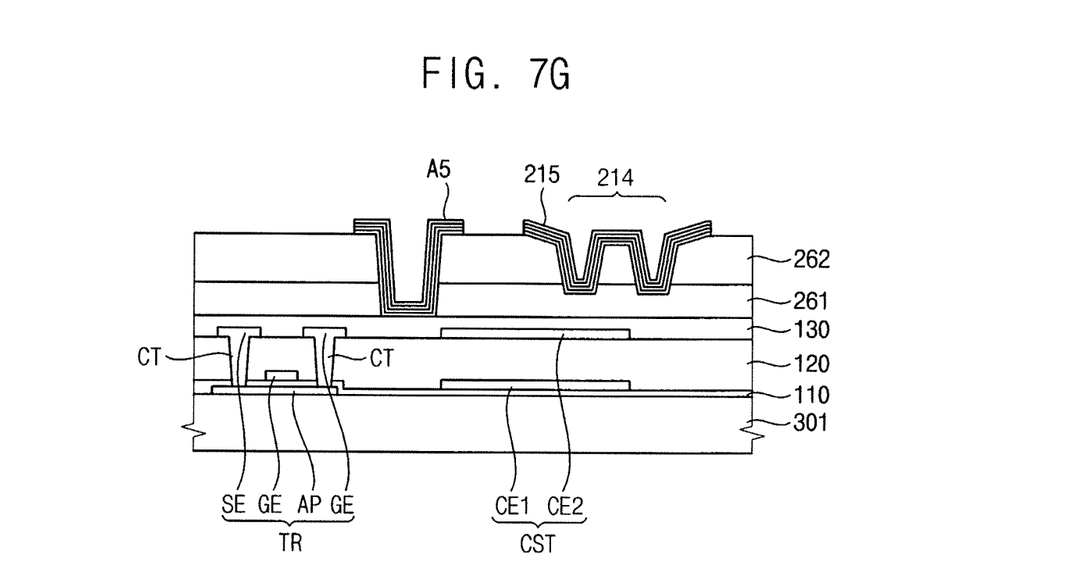

Referring to FIGS. 1, 7F and 7G, a second mask pattern 282 is formed on the first base substrate 301 on which the low reflection layer 206 is formed. The base layer 201 and the low reflection layer 206 are patterned to form the shutter part 200 using the second mask pattern 282. The shutter part 200 includes, for example, the micro shutter 210, the driving electrodes 221 and 222, the reference electrodes 231 and 232, and the anchors A1, A2-A10. As shown in FIG. 7G, the anchor A5, the trench part 214 and the slope part 215 are formed.

Figure 7H:
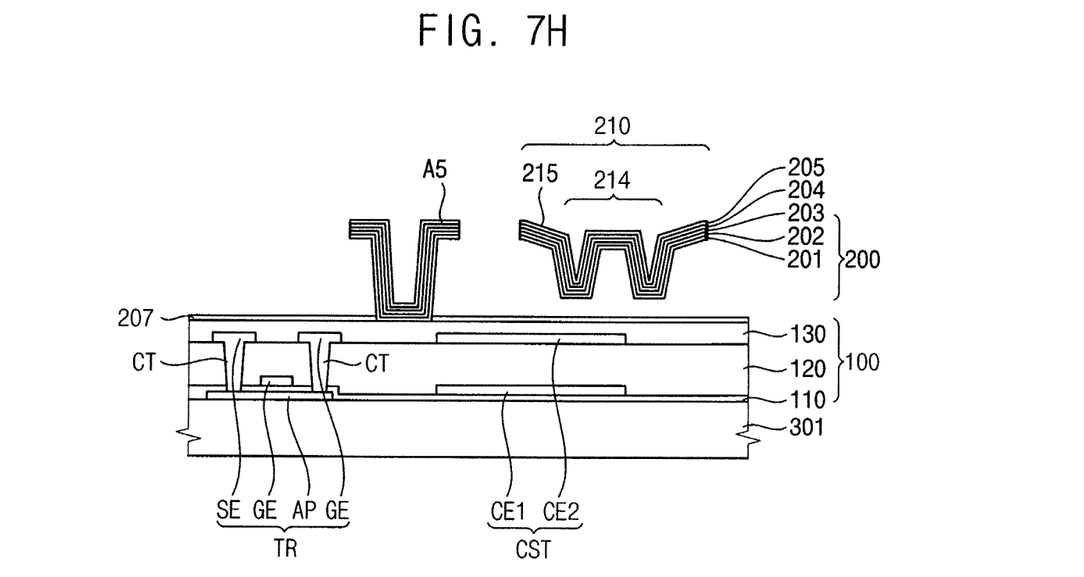

Referring to FIGS. 1 and 7H, the first and second sacrificing layers 261 and 262 are removed when the shutter part 200 is completed. Therefore, the micro shutter 210, the driving electrodes 221 and 222, and the reference electrodes 231 and 232 are formed on the circuit part 100. The micro shutter 210 is fixed on the circuit part 100 of the first display substrate 100 by the anchors A1-A10 and is spaced apart from the circuit part 100 of the first display substrate 100. The driving electrodes 221 and 222 are connected to the micro shutter 210. The reference electrodes 231 and 232 face the driving electrodes 221 and 222, respectively. As shown in FIG. 7G, the blocking part 211 of the micro shutter 210 includes, for example, the trench part 214 which includes at least two trench structures 214a and 214b and the slope part 215 which is sloped around the edge portion of the opening part 213.

Therefore, the shutter part 200 is formed on the first base substrate on which the circuit part 100 is formed.

The protecting layer 207 is formed on the first base substrate 301 on which the shutter part 200 is formed. The protecting layer 207 may be, for example, a silicon nitride (SiNx) layer. For example, the protecting layer 207 may have a thickness of about 800 Å or about 1650 Å.

For example, the micro shutter 210 has a multi-layered structure including, for example, an amorphous silicon (a—Si) layer 201 having a thickness of about 3000 Å, an aluminum (Al) layer 202 having a thickness of about 1400 Å, a silicon oxide (SiO$_2$) layer 203 having a thickness of about 850 Å, a titanium (Ti) layer 204 having a thickness of about 150 Å and a silicon nitride (SiNx) layer 205 having a thickness of about 800 Å which are sequentially stacked with each other. Alternatively, the micro shutter 210 has a multi-layered structure including, for example, an amorphous silicon (a—Si) layer 201 having a thickness of about 3000 Å, an aluminum (Al) layer 202 having a thickness of about 1400 Å, a silicon oxide (SiO$_2$) layer 203 having a thickness of about 850 Å, a titanium (Ti) layer 204 having a thickness of about 150 Å and a silicon nitride (SiNx) layer 205 having a thickness of about 1650 Å which are stacked with each other. For example, the low reflection layer 206 of the micro shutter 210 may further include the silicon nitride (SiNx) layer 205.

In addition, the display substrate 300 of the area in which the second blocking electrode CE2 is formed, may include, for example, the second blocking electrode CE2, the third insulating layer 130 and the protecting layer 205. The second blocking electrode CE2 may include, for example, a titanium (Ti) layer having a thickness of about 1500 Å, an aluminum (Al) layer having a thickness of about 3000 Å and a titanium (Ti) layer having a thickness of about 1000 Å. The third insulating layer 130 may be, for example, a silicon nitride (SiNx) layer having a thickness of about 1900 Å. The protecting layer 205 may be, for example, a silicon nitride (SiNx) layer having a thickness of about 800 Å.

As a result, the light is absorbed into the low reflection layer 206 uniformly deposited at the slope side wall and the bottom surface of the trench part 214, so that the light may be prevented from being leaked out. In addition, the slope part 215 which is the edge portion of the blocking part 211 defining the opening part 213 slopes toward the light control substrate 400. The number of times that the light is reflected between the light control substrate 400 and the slope part 215 may be increased so that the energy of the light may be decreased. In addition, the slope part 215 reflects the light toward the light control substrate 400 so that the light may be prevented from being leaked out. In addition, the characteristic and the thickness of the metal material forming the second blocking electrode CE2 and the characteristic and the thickness of the insulation material forming the third insulating layer 130 may be adjusted so that the area in which the second blocking electrode CE2 is disposed may obtain the low reflection characteristic. Therefore, the second blocking electrode CE2 may absorb a light hitting thereto so that the light may be prevented from being leaked out.

According to an exemplary embodiment, the light is absorbed into the low reflection layer deposited on the slope side wall and the bottom surface of the trench part included in the micro shutter and the energy of the light is decreased by the slope part disposed at the edge portion of the opening part included in the micro shutter. In addition, the light is absorbed into the area in which the blocking electrode of the circuit part is disposed, so that the light may be prevented from being leaked out. Therefore, the contrast ratio of the display panel may be increased, so that the display panel may obtain a wide viewing angle.

Having described exemplary embodiments of the inventive concept, it is further noted that it is readily apparent to those of reasonable skill in the art that various modifications may be made without departing from the spirit and scope of the invention which is defined by the metes and bounds of the appended claims.

What is claimed is:
1. A display substrate comprising:
   a base substrate;
   a micro shutter disposed on the base substrate and including a plurality of opening parts and a blocking part, wherein the blocking part has a non-planar shape having at least two peaks continuously connected to each other by one or more intervening nadirs, and wherein the blocking part is disposed between an adjacent pair of the opening parts;
   a first driving electrode connected to a first side of the micro shutter;

a second driving electrode connected to a second side of the micro shutter opposite to the first side of the micro shutter; and a plurality of anchors fixing the first and second driving electrodes and the micro shutter on the base substrate.

2. The display substrate of claim 1, wherein the micro shutter includes a slope part disposed at an edge portion of the opening part.

3. The display substrate of claim 2, wherein the slope part has a positive slope angle with respect to the base substrate.

4. The display substrate of claim 1, wherein the micro shutter includes a base layer and a low reflection layer having a multi-layered structure, and wherein the low reflection layer is disposed on the base layer.

5. The display substrate of claim 4, wherein the low reflection layer includes a first layer including aluminum (Al), a second layer including silicon oxide (SiOx), a third layer including titanium (Ti) and a fourth layer including silicon nitride (SiNx).

6. The display substrate of claim 5, wherein the base layer includes amorphous silicon (a-Si).

7. The display substrate of claim 6, wherein the micro shutter includes an amorphous silicon layer having a thickness of about 3000 Å, an aluminum layer having a thickness of about 1400 Å, a silicon oxide layer having a thickness of about 850 Å, a titanium layer having a thickness of about 150 Å and a silicon nitride layer having a thickness of about 800 Å.

8. The display substrate of claim 6, wherein the micro shutter includes an amorphous silicon layer having a thickness of about 3000 Å, an aluminum layer having a thickness of about 1400 Å, a silicon oxide layer having a thickness of about 850 Å, a titanium layer having a thickness of about 150 Å and a silicon nitride layer having a thickness of about 1650 Å.

9. The display substrate of claim 1, further comprising: a storage capacitor disposed between the base substrate and the micro shutter, wherein the storage capacitor includes a first blocking electrode disposed on the base substrate and a second blocking electrode overlapping with the first blocking electrode.

10. The display substrate of claim 9, further comprising: an insulating layer disposed on the second blocking electrode and a protecting layer disposed on the insulating layer and wherein the insulating layer and the protecting layer are each formed of silicon nitride.

11. The display substrate of claim 10, wherein the second blocking electrode is a multi-layered structure including a titanium layer having a thickness of about 1500 Å, an aluminum layer having a thickness of about 3000 Å and a titanium layer having a thickness of about 1000 Å, and wherein the insulating layer has a thickness of about 1900 Å and the protecting layer has a thickness of about 800 Å.

12. A display panel comprising:
a display substrate comprising:
a first base substrate including a plurality of pixel areas, wherein each of the pixel areas includes a shutter area and a driving area surrounding the shutter area,
a circuit part disposed on the first base substrate, wherein the circuit part includes a plurality of signal lines, a storage capacitor and a plurality of switching elements electrically connected to the signal lines and the storage capacitor,
a shutter part including a micro shutter disposed on the first base substrate and including an opening part, a plurality of blocking parts, a base layer and a multi-layered low reflection layer, wherein the blocking parts each include at least two trench structures and a slope part disposed around an edge portion of the opening part such that each of the blocking parts has a non-planar shape having at least two peaks continuously connected to each other by one or more intervening nadirs defined by the slop part and the at least two trench structures, wherein the opening part is disposed between an adjacent pair of the blocking parts and wherein the base layer and the multi-layered low reflection layer of the micro shutter are sequentially stacked on an inclined sidewall and a bottom portion of the at least two trench structures and on the slope part of the blocking parts,
a first driving electrode connected to a first side of the micro shutter,
a second driving electrode connected to a second side of the micro shutter opposite to the first side of the micro shutter, and
a plurality of anchors fixing the first and second driving electrodes and the micro shutter on the base substrate;
a light control substrate disposed opposite to the display substrate, wherein the light control substrate includes a second base substrate, a transmitting area and a reflection area, a reflection part composed of a high reflection layer and a low reflection layer sequentially stacked on the second base substrate in the reflection area, and a transmitting hole disposed in a portion of the light control substrate in the transmitting area; and
a fluid layer disposed in between the display substrate and the light control substrate.

13. The display panel of claim 12, further comprising a first reference electrode disposed in the driving area and spaced apart from the first driving electrode and a second reference electrode disposed in the driving area and spaced apart from the second driving electrode, wherein the first reference electrode includes a first extending electrode which is connected to the first reference electrode and substantially parallel thereto and the second reference electrode includes a second extending electrode which is connected to the second reference electrode and substantially parallel thereto, wherein the switching element formed on the first base substrate includes an active pattern, and wherein the storage capacitor includes a first blocking electrode and a second blocking electrode overlapping with the first blocking electrode and wherein the slope part of the blocking parts slope toward the light control substrate.

14. The display panel of claim 13, further comprising a first insulating layer formed on the first base substrate and covering the active pattern; a second insulating layer formed on the first insulating layer and covering the first blocking electrode; and a third insulating layer formed on the second insulating layer and covering the second blocking electrode.

* * * * *